Figure 3:
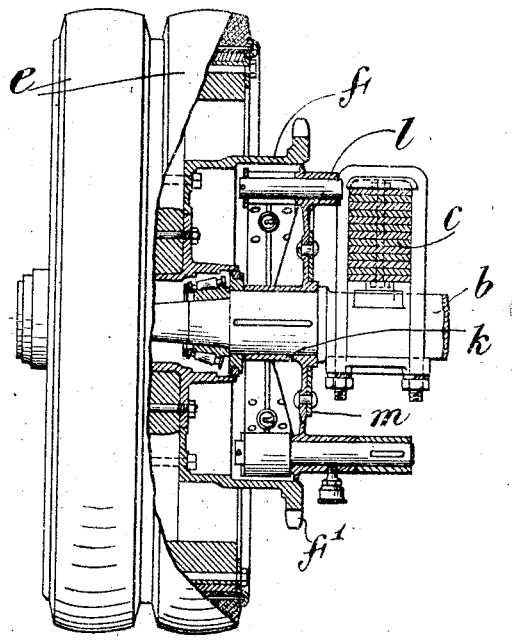

A. F. MASURY.
MOTOR VEHICLE.
APPLICATION FILED SEPT. 11, 1915.
1,188,962.
Patented June 27, 1916.
2 SHEETS—SHEET 1.
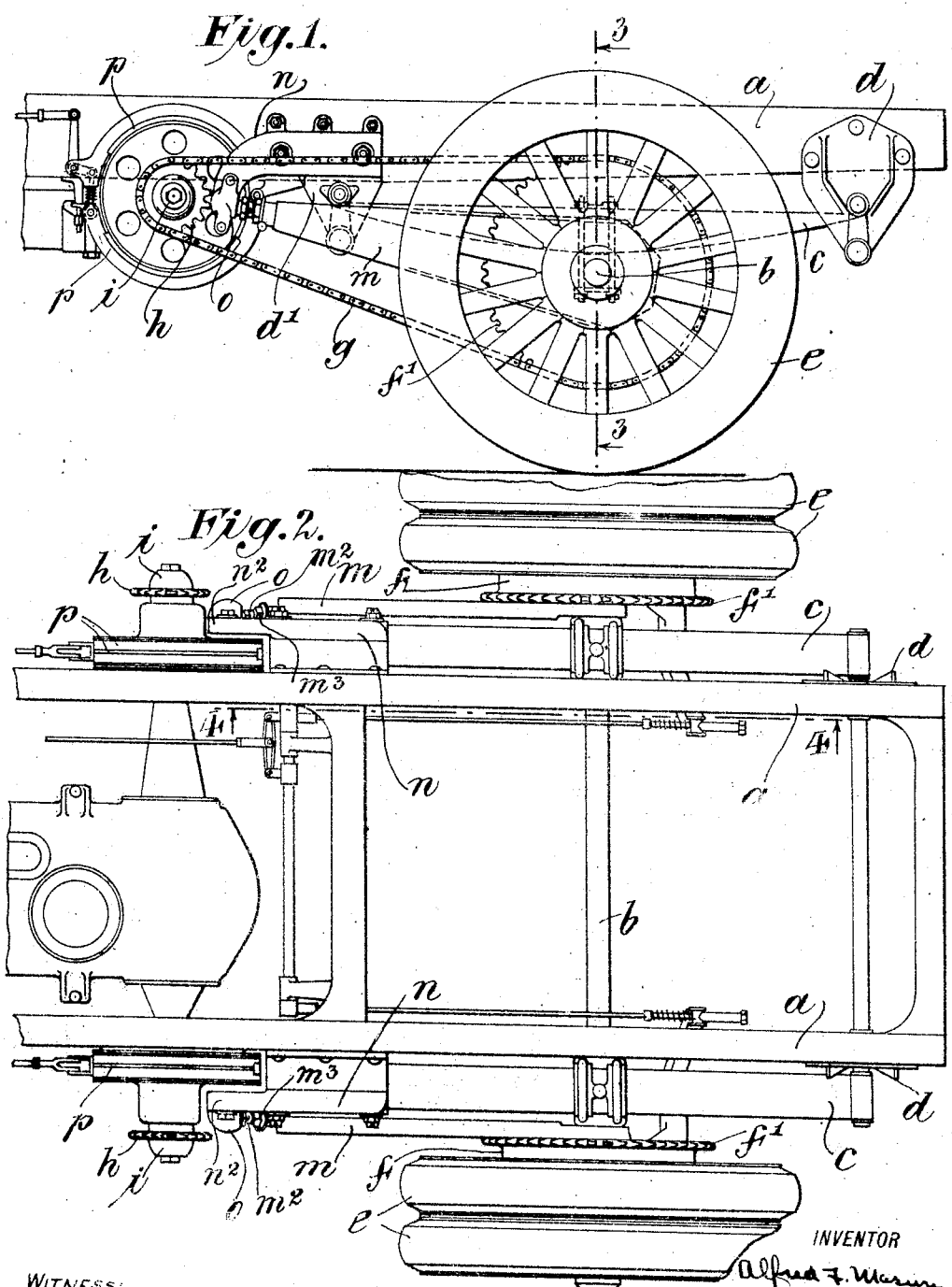

A. F. MASURY.
MOTOR VEHICLE.
APPLICATION FILED SEPT. 11, 1915.

1,188,962.

Patented June 27, 1916.
2 SHEETS—SHEET 2.

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

MOTOR-VEHICLE.

1,188,962.  Specification of Letters Patent.  Patented June 27, 1916.

Application filed September 11, 1915.  Serial No. 50,128.

*To all whom it may concern:*

Be it known that I, ALFRED F. MASURY, a citizen of the United States, residing in the borough of Manhattan of the city of New York, in the county of New York, in the State of New York, have invented certain new and useful Improvements in Motor-Vehicles, of which the following is a specification, reference being had to the accompanying drawings, forming a part hereof.

This invention relates to motor vehicles and is concerned particularly with the improvements of the construction and the organization of parts of the distance rods and associated elements on the rear axle of a chain drive motor truck.

It is well recognized in motor practice that it is desirable to have the springs of a truck outside of the side frame members of the chassis and as near to the wheels as is practicable, but this desirable organization has not been realized hitherto because of the means for connecting the distance rods to the chassis and because of the physical limitation imposed by the distance rods on the positioning of the springs at the most advantageous points on the axle. The difficulty of solving this problem will be appreciated when it is remembered that the distance rods must be disposed substantially parallel to the side frame members because it is through the distance rods that the driving power is transmitted from the wheels to the chassis. This driving power becomes, in effect, a push on the chassis by the rods and were the rods disposed in angular positions with respect to the side frame members, the push thereon would likewise be exerted along lines disposed angularly to the direction of travel, with resulting strains and a marked loss in power.

In accordance with the present invention the difficulties referred to have been successfully eliminated by improving the entire construction associated with the rear axle of motor trucks and embodying therein a disposition of the usual elements, many of which are improved, by which the driving force of the wheels is transmitted to the chassis without loss and along lines parallel to the direction of travel; the springs of the truck are disposed outside of the side frame members of the chassis and very near to the rear wheels; and the distance rods are mounted in juxtaposition to and in parallelism with but independent of the driving chains and the bearings for the drive shaft.

The invention will be described more particularly with reference to the accompanying drawings in which—

Figure 4:
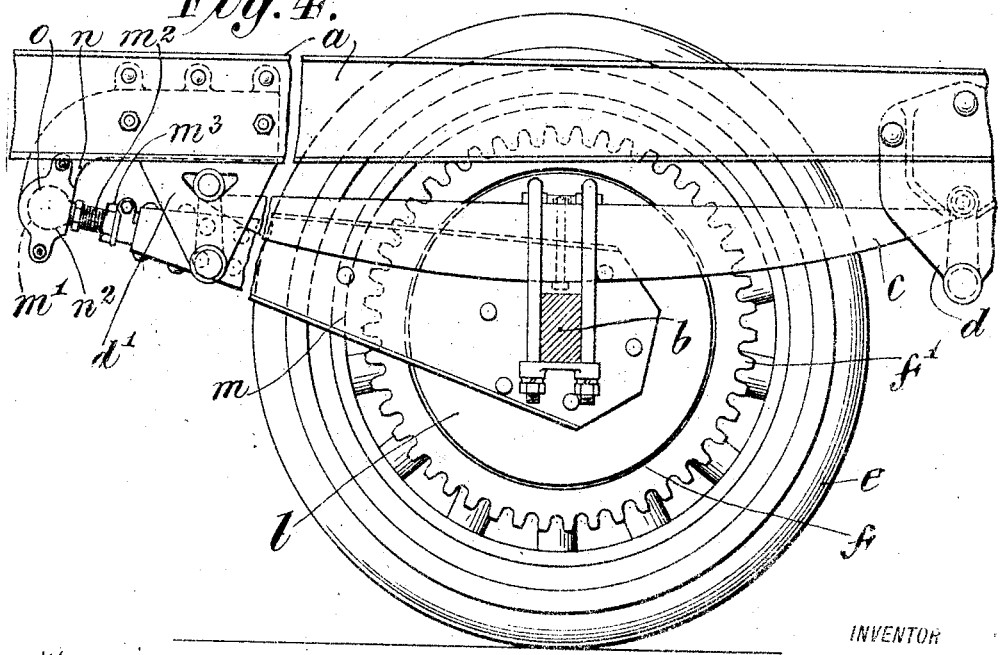

Figure 1 is a view in side elevation of a fragment of the chassis of a motor truck to which the improvements are shown as applied. Fig. 2 is a view in plan of so much of the truck as is shown in Fig. 1. Fig. 3 is a detail view on a somewhat larger scale of a rear wheel of a truck showing clearly the relative disposition of the wheel, the driving sprocket, the distance rod and the spring, parts being broken away in the interest of clearness. Fig. 4 is a detail view on a somewhat larger scale of a portion of the chassis and showing particularly the disposition of the distance rod between the rear wheel and the chassis.

While the invention will be described with reference to its application to motor trucks it is to be understood that this is not to be taken as a limitation on the scope of its usefulness for its advantages may be availed of under widely different conditions. The side frame members $a$ of the chassis of the truck illustrated are supported on the rear axle $b$ through suitable springs $c$ disposed one at each side of the side frame members $a$ and connected to the frame members through any usual or suitable brackets $d$ $d'$. On the ends of the axle are mounted, on suitable bearings, the driving wheels $e$ to the inner faces of which are bolted drums $f$ formed at the inner edge with sprocket teeth $f'$ over which pass the driving chains $g$ to the driving sprocket $h$ fixed to the end of the transverse driving shaft $i$, all in a manner well known. At the ends of the axle $b$ and within the drums $f$ are fastened hubs $k$ on which are formed circular plates $l$ which fit snugly within the open ends of the drums and close the same for reasons which will be evident. To the exposed faces of the circular plates are secured distance rods $m$ the ends of which may be provided with openings to receive the hubs $k$ of the plates $l$ so that the pushing effort of the wheels which is to be transmitted through the distance rods may be impressed thereon directly from the axle $b$. The rods extend forwardly in parallelism with the side frame members $a$ of the chassis and the springs $c$ and carry at their forward ends bearing balls $m'$ which are adjustable with respect to the rods $m$ through a threaded shank $m^2$ and suitable lock nuts $m^3$, in a convenient and simple manner.

From Fig. 2 it will be evident that the distance rods $m$ are disposed at quite a distance from the side frame members of the chassis and since they extend in parallelism thereto it is necessary to provide special brackets to engage the ends of the distance rods and transmit the push therefrom to the chassis. Such brackets are indicated at $n$ and, as it will be seen, are affixed securely to the outer sides of the frame members $a$ and, being of appreciable thickness, or being spaced from the side frame members by suitable spacing blocks which may conveniently consist of the supporting brackets $d'$ for the front ends of the springs $c$, present bearings $n^2$ in which the balls $m'$ rest, respectively. From Fig. 4 it will be evident that the brackets $n$ may be curved downwardly at their ends so as to bring the bearings $n^2$ in proper position to receive the balls $m'$ and afford a convenient seat therefor. For instance, in the illustrated embodiment, the bearing for the ball $m'$ is provided in each bracket with a removable cap $o$ which is detachably secured to the bracket and may be removed as may be necessary for reasons which will be evident.

The distance rods and the bearings therefor are entirely independent of the bearings for the drive shaft $i$ so that the push of the distance rod is not imposed upon the drive shaft or its bearings. Former constructions have included the transmission of the push from the axle to the drive shaft and its bearings and thence to the side frame members, but the present improvement seeks to avoid the disadvantages of this structure with the attendant strains imposed upon the driving elements by connecting the distance rods directly to the side frame members through independent couplings provided therefor.

From the description given it will be evident that the improved construction resides not only in the character of the devices for realizing the stated objects but also in the organization of parts and in their relative disposition. The springs $c$ in the improved construction lie wholly outside of the main frame members $a$ of the chassis and yet, as seen in Fig. 3, are disposed very near to the tread of the wheels. This desirable arrangement, however, does not interfere with the location of the other elements in that the drum $f$ permits the large chain sprocket $f'$ to lie near the driving wheels and the distance rods $m$ to extend in parallelism with the driving chains and lie in juxtaposition therewith. The driving power of the wheels is not transmitted through the springs or other parts obviously more or less unsuited to perform this function, such as the bearings for the drive shaft $i$, but is transmitted in the most effective manner directly to the chassis through the axle $b$ and distance rods $m$. The importance of the parallel disposition of these rods with respect to the side frame members has been noted before and so it is unnecessary to refer at greater length to the improved bracket and bearings $n^2$ by which it is possible to transmit the driving power to the chassis without inclining the distance rods. The purpose of the spherical bearing $n^2$ is to permit free swinging movement of the distance rods thereabout to conform with the movements of the axle which, in modern approved constructions does not remain always in the same vertical plane but is permitted to have a slight lateral movement through the toggle connection of the springs with the chassis. In keeping with the clean construction permitted by the improved organization pointed out, it is well to note that the present invention permits the brake bands $p$ on the transverse driving shaft $i$ to coöperate with the chassis on drums carried outside of the side frame members instead of inside of these members, as is usual.

Modifications in details of the construction may be made without departing from the spirit of the invention, provided the advantages noted are realized and such changes fall within the scope of the appended claims.

What I claim is:—

1. In a motor vehicle, in combination with the side frame members of the chassis and axle, springs for the chassis mounted on the axle outside of the side frame members and near the wheels, chain sprockets mounted on the wheels and disposed in planes near the planes of the wheels, distance rods connected to the axle in juxtaposition to the sprockets and outside of the springs, said distance rods extending in parallelism to the driving chains alongside of the same and mounted independently thereof, and brackets mounted on the side frame members to receive the ends of the distance rods and maintain the same in parallelism, said brackets being independent of the bearings for the drive sprockets.

2. In a motor vehicle, in combination with the side frame members of the chassis and axle, springs for the chassis mounted on the axle outside of the side frame members, toggle connections for the ends of the springs to the side frame members, a drum mounted on each wheel, a chain sprocket formed on the inner edge of each drum, a disk disposed in the open end of the drum and carried on the axle, a distance rod secured to the disk and extending parallel to the adjacent side frame member and alongside of the driving chain, a bracket on the side frame member extending outward therefrom, a capped bearing in the bracket, and a bearing ball adjustably mounted on the end of the distance rod to rest in said bearings and permit movement of the distance rod.

This specification signed this ninth day of September, A. D. 1915.

ALFRED F. MASURY.